(12) United States Patent
Ahmed et al.

(10) Patent No.: US 9,227,659 B2
(45) Date of Patent: Jan. 5, 2016

(54) VEHICLE LANE CONTROL USING DIFFERENTIAL TORQUE

(71) Applicant: GM GLOBAL TECHNOLOGY OPERATIONS LLC, Detroit, MI (US)

(72) Inventors: Sami Ahmed, Orion Township, MI (US); Matthew M. Karaba, Oxford, MI (US); Paul R. Williams, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 4 days.

(21) Appl. No.: 14/161,160

(22) Filed: Jan. 22, 2014

(65) Prior Publication Data

US 2015/0203151 A1 Jul. 23, 2015

(51) Int. Cl.
*B62D 15/02* (2006.01)
*B62D 6/00* (2006.01)

(52) U.S. Cl.
CPC ........................................ *B62D 6/001* (2013.01)

(58) Field of Classification Search
None
See application file for complete search history.

(56) References Cited

U.S. PATENT DOCUMENTS

| | | | |
|---|---|---|---|
| 8,494,716 B1* | 7/2013 | Lee et al. | 701/41 |
| 2004/0107035 A1* | 6/2004 | Tange et al. | 701/70 |
| 2005/0096827 A1* | 5/2005 | Sadano et al. | 701/70 |
| 2012/0283912 A1* | 11/2012 | Lee et al. | 701/41 |
| 2013/0238192 A1* | 9/2013 | Breu | 701/41 |
| 2013/0253793 A1* | 9/2013 | Lee et al. | 701/70 |

* cited by examiner

*Primary Examiner* — Thomas Tarcza
*Assistant Examiner* — Richard Goldman
(74) *Attorney, Agent, or Firm* — Ingrassia Fisher & Lorenz, P.C.

(57) ABSTRACT

Methods and systems are provided for implementing a lane control feature for vehicles having a passenger side, a driver side, one or more wheels on the passenger side, and one or more wheels on the driver side. A sensor is configured to obtain information pertaining to operation of a vehicle with respect to a lane of a roadway. The processor is coupled to the sensor, and is configured to at least facilitate determining, using the information, whether the lane control feature is activated, and providing differential torque between one or more driver side wheels and one or more passenger side wheels when the lane control feature is activated.

16 Claims, 3 Drawing Sheets

VEHICLE LANE CONTROL USING DIFFERENTIAL TORQUE

TECHNICAL FIELD

The present disclosure generally relates to the field of vehicles and, more specifically, to methods and systems for implementing vehicle lane control using differential torque.

BACKGROUND

Certain vehicles today have one or more automatic lane control systems, such as a lane keeping assist (LKA) system or a lane centering assist (LCA) system. Such systems may provide lateral assistance keeping the vehicle within the vehicle's lane and/or centered within the lane. For example, an LKA system for a vehicle may cause the vehicle to automatically steer back into the vehicle's lane if it is determined that the vehicle is inadvertently drifting out of the vehicle's lane. By way of further example, an LCA system may cause the vehicle to automatically steer back to the center of the vehicle's lane if the vehicle veers off-center within the lane. However, existing systems may not always provide for optimal feel for the driver, which may in certain circumstances cause the driver to disable such systems.

Accordingly, it is desirable to provide improved techniques for lane control methods and systems, such as LKA and/or LCA systems. It is also desirable to provide methods, systems, and vehicle utilizing such techniques. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method for implementing a lane control feature for a vehicle having a passenger side, a driver side, one or more wheels on the passenger side, and one or more wheels on the driver side, is provided. The method comprises determining whether the lane control feature is activated, and providing differential torque between one or more driver side wheels and one or more passenger side wheels when the lane control feature is activated.

In accordance with another exemplary embodiment, a system for implementing a lane control feature for a vehicle having a passenger side, a driver side, one or more wheels on the passenger side, and one or more wheels on the driver side is provided. The system comprises a sensor and a processor. The sensor is configured to obtain information pertaining to operation of a vehicle with respect to a lane of a roadway. The processor is coupled to the sensor, and is configured to at least facilitate determining, using the information, whether the lane control feature is activated, and providing differential torque between one or more driver side wheels and one or more passenger side wheels when the lane control feature is activated.

In accordance with another exemplary embodiment, a vehicle is provided. The vehicle includes a body having a passenger side and a driver side, one or more wheels on the passenger side, one or more wheels on the driver side, a sensor, and a processor. The sensor is configured to obtain information pertaining to operation of a vehicle with respect to a lane of a roadway. The processor is coupled to the sensor, and is configured to at least facilitate determining, using the information, whether the lane control feature is activated, and providing differential torque between one or more driver side wheels and one or more passenger side wheels when the lane control feature is activated.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
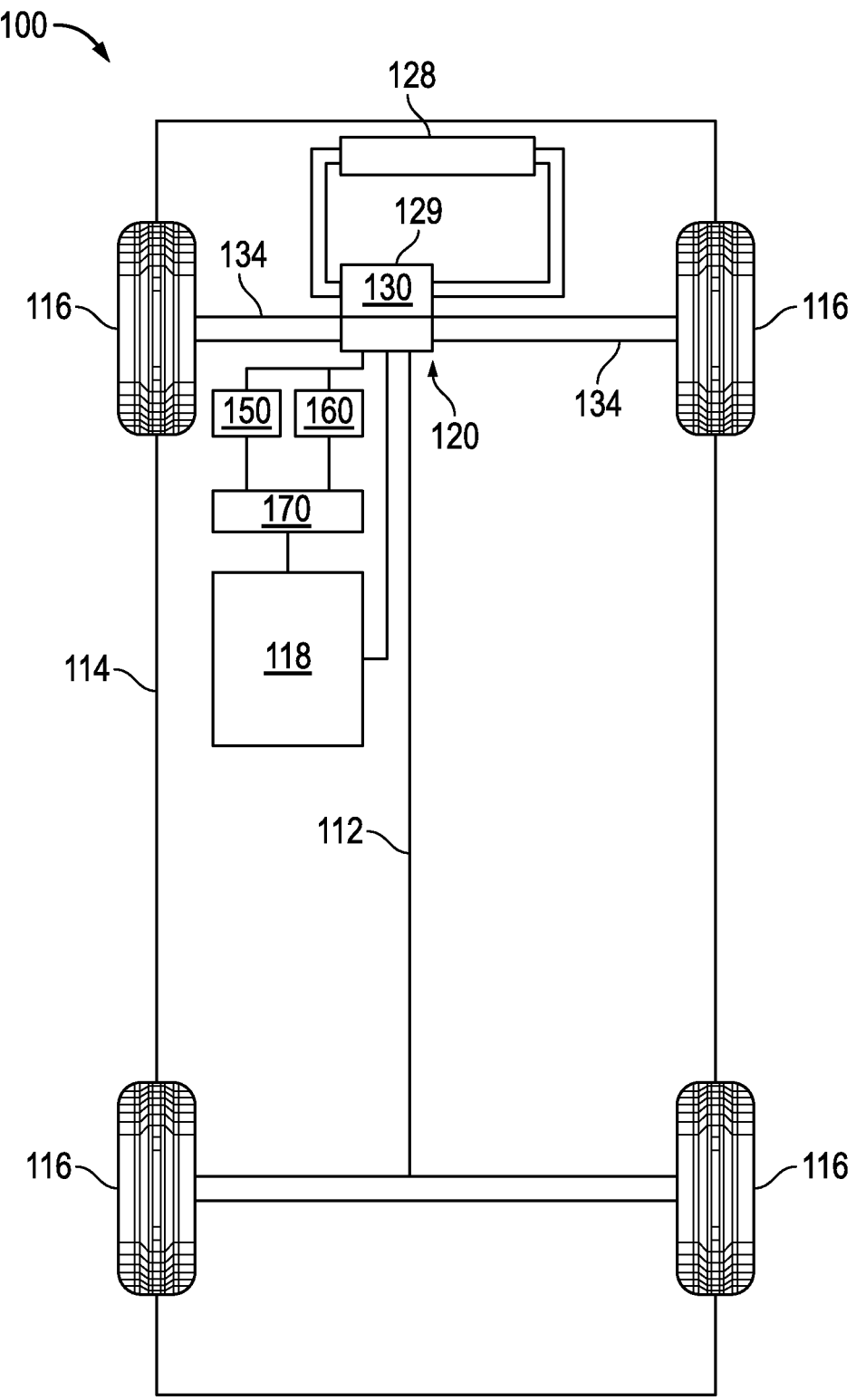
FIG. 1 is a functional block diagram of a vehicle that includes a lane control system, such as an LKA or LCA system, in accordance with an exemplary embodiment.

FIG. 1 illustrates a vehicle 100, or automobile, according to an exemplary embodiment. As described in greater detail further below, the vehicle 100 includes a control system 170 that provides for automatic lane control for the vehicle using differential torque for the wheels of the vehicle 100.

With reference again to FIG. 1, the vehicle 100 includes a chassis 112, a body 114, four wheels 116, an electronic control system 118, a steering system 150, a braking system 160, and the above-referenced control system 170. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114.

The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and ethanol), a gaseous compound (e.g., hydrogen or natural gas) fueled engine, a combustion/electric motor hybrid engine, and an electric motor.

In the exemplary embodiment illustrated in FIG. 1, the vehicle 100 includes an actuator assembly 120 and a radiator 128. The actuator assembly 120 includes at least one propulsion system 129 mounted on the chassis 112 that drives the wheels 116. In the depicted embodiment, the actuator assembly 120 includes an engine 130. In one embodiment, the engine 130 comprises a combustion engine. In other embodiments, the actuator assembly 120 may include one or more other types of engines and/or motors, such as an electric motor/generator, instead of or in addition to the combustion engine.

Still referring to FIG. 1, the engine 130 is coupled to at least some of the wheels 116 through one or more drive shafts 134.

In some embodiments, the engine 130 is mechanically coupled to the transmission. In other embodiments, the engine 130 may instead be coupled to a generator used to power an electric motor that is mechanically coupled to the transmission.

The radiator 128 is connected to the frame at an outer portion thereof. Although not illustrated in detail, the radiator 128 includes multiple cooling channels therein that contain a cooling fluid (i.e., coolant) such as water and/or ethylene glycol (i.e., "antifreeze"), and is coupled to the engine 130.

The steering system 150 is mounted on the chassis 112, and controls steering of the wheels 116. The steering system 150 includes a steering wheel and a steering column (described further below in connection with FIG. 2). The steering wheel receives inputs from a driver of the vehicle. The steering column results in desired steering angles for the wheels 116 via the drive shafts 134 based on the inputs from the driver.

The braking system 160 is mounted on the chassis 112, and provides braking for the vehicle 100. The braking system 160 receives inputs from the driver via a brake pedal (not depicted), and provides appropriate braking via brake units (also not depicted). The driver also provides inputs via an accelerator pedal (not depicted) as to a desired speed or acceleration of the vehicle, as well as various other inputs for various vehicle devices and/or systems, such as one or more vehicle radios, other entertainment systems, environmental control systems, lightning units, navigation systems, and the like (also not depicted).

The control system 170 is mounted on the chassis 112. The control system 170 provides for automatic lane control for the vehicle using differential torque for the wheels of the vehicle 100, in accordance with the steps for the process 300 depicted in FIG. 3 and described further below in connection therewith. The control system 170 may comprise all or part of, and/or may be coupled to, various other vehicle devices and systems, such as, among others, the steering system 150, the actuator assembly 120, and/or the electronic control system 118. For example, in certain embodiments, the control system 170 may also control certain aspects of such systems, for example of the steering system 150 and/or the actuator assembly 120.

Figure 2:
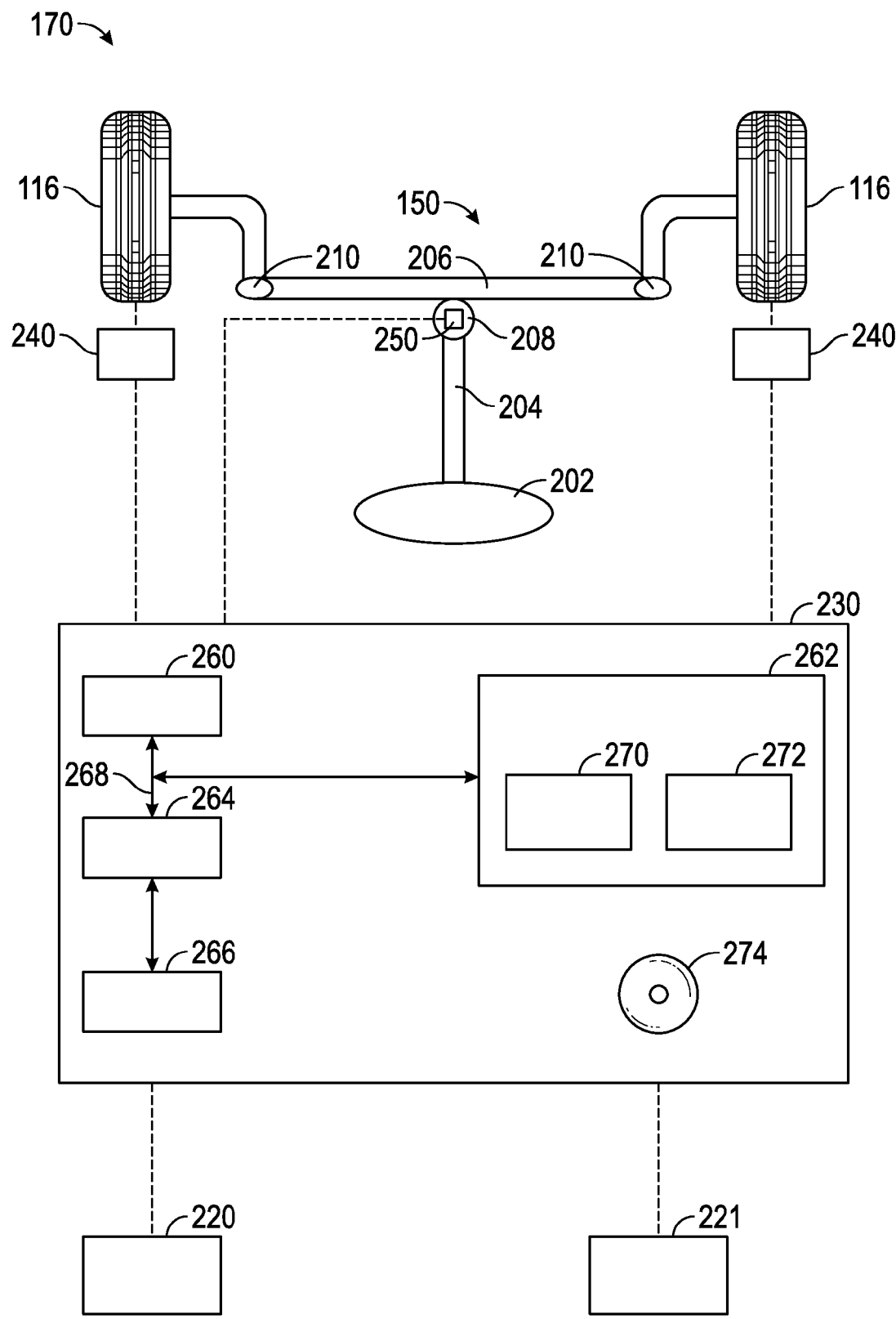
FIG. 2 is a functional block diagram of a control system that can be used in connection with the vehicle of FIG. 1, in accordance with an exemplary embodiment.

With reference to FIG. 2, a functional block diagram is provided for the control system 170 of FIG. 1, in accordance with an exemplary embodiment. The control system 170 is depicted in FIG. 2 along with the steering system 150. The exemplary steering system 150 of FIG. 2 is a rack and pinion system that includes a steering wheel mass 202, a steering column assembly 204, a rack 206, a differential 208 (or control pinion), and universal joints 210.

For the exemplary steering system 150 of FIG. 2, the steering column assembly 204 is coupled to the steering wheel mass 202, and is rotationally movable thereby. The steering column assembly 204 is configured to at least facilitate movement of wheels 116 of the vehicle 100 of FIG. 1 based at least in part on movement of the steering wheel mass 202. Specifically, operation of the steering wheel mass 202 causes rotational movement of the steering column assembly 204 and thereby ultimately causing rotation of the wheels 116 of the vehicle 100 via the differential 208 (coupled to the steering column assembly 204), the rack 206 (coupled to the differential 208), and the universal joint 210 (coupled between the rack 206 and the wheel 116). In certain embodiments, the steering wheel mass 202 may be a steering wheel. In certain other embodiments, the steering wheel mass 202 not be an actual steering wheel, but may only be a representative mass with a predetermined or measureable Polar Moment of Inertia (PMI) attached to the upper end of the steering column assembly 204.

While the control system 170 and steering system 150 are depicted in FIG. 2 with respect to two wheels 116 (namely, a front driver side wheel and a front passenger side wheel), it will be appreciated that in various embodiments the control system 170 and steering system 150 may be similarly implemented in connection with each of the wheels 116 of the vehicle 100 of FIG. 1. In addition, as noted above, the control system 170 may include part or all of the steering system 150 in certain embodiments, and/or may be coupled to and/or may otherwise operate in conjunction with the steering system 150.

As depicted in FIG. 2, the control system 170 includes a sensor array 220, a controller 230, and one or more motors 240 and/or actuators 250. The sensor array 220 includes one or more sensors configured to obtain information pertaining to operation of the vehicle with respect to a lane of a roadway in which the vehicle is travelling. In certain embodiments, the sensor array 220 comprises detection sensors such as one or more cameras and/or other vision-based detection devices, radar devices (such as long and short range radar detection devices), and/or other target vehicle detection devices such as, by way of example, light detection and ranging (LIDAR) and/or vehicle-to-vehicle (V2V) communications. In one embodiment, one or more sensors of the sensor array 220 are disposed in a front portion of the vehicle.

The motors 240 are coupled to the wheels 116 of the vehicle 100 or, in certain embodiments, are disposed within the wheels 116 themselves. In one embodiment, the motors 240 comprise wheel hub motors that are each disposed within a wheel hub of a respective one of the wheels 116. In another embodiment, the motors 240 are disposed within the wheels 116 themselves, as mentioned above. In one embodiment, one motor 240 is coupled to one of the wheels 116 of the vehicle 100 of FIG. 1 on the passenger side of the vehicle (i.e., "passenger side wheels"), and a different motor 240 is coupled to one of the wheels 116 on the driver side of the vehicle (i.e., "driver side wheels"). In certain embodiments, a different motor 240 is coupled to each of the wheels 116 of the vehicle 100. Each motor 240 provides torque to the respective wheel 116 to which it is coupled (or in which it is disposed), resulting in movement of the wheel 116, in accordance with instructions provided by the controller 230 (preferably by the processor 260 thereof).

The actuators 250 provide differential torque to different sides of the rack 206, and thus to the different universal joints 210 of the steering system 150, and ultimately to the different wheels 116, based on instructions provided by the controller 230. This results in a torque vectoring differential between the one or more driver side wheels and the one or more passenger side wheels via a steering system of the vehicle, in accordance with the instructions provided by the controller 230 (preferably by the processor 260 thereof). In one embodiment, the actuators 250 are disposed within the differential 208. In addition, in one such embodiment, one or more actuators 250 of the differential 208 are coupled via a passenger side of the rack 206 to the passenger side wheels 116 via passenger side universal joints 210, while one or more additional actuators 250 of the differential 208 are coupled via a driver side of the rack 206 to the driver side wheels 116 via driver side universal joints 210. While motors 240 and actuators 250 are both depicted in FIG. 2, it will be appreciated that in certain embodiments motors 240 may be used but not actuators 250, or vice versa.

The controller 230 is coupled to the sensor array 220 and to the motors 240 and/or actuators 250. In addition, in certain embodiments, the controller 230 is also coupled to one or more other vehicle systems 221 (such as the electronic control system 118 of FIG. 1 and/or a global positioning system (GPS) device) that may provide additional information pertaining to the vehicle and the lane in which it is travelling. Based upon this information, the controller 230 provides for automatic lane control functionality (e.g., LKA or LCA functionality) via instructions provided to the motors 240 and/or actuators 250 to provide for differential torque between the passenger side wheels and the driver side wheels, in accordance with the steps of the process 300 depicted in FIG. 3 and discussed further below in connection therewith.

As depicted in FIG. 2, the controller 230 comprises a computer system. In certain embodiments, the controller 230 may also include one or more of the sensor array 220, motors 240, actuators 250, steering system 150, and/or other systems 221. In addition, it will be appreciated that the controller 230 may otherwise differ from the embodiment depicted in FIG. 2. For example, the controller 230 may be coupled to or may otherwise utilize one or more remote computer systems and/or other control systems.

In the depicted embodiment, the computer system of the controller 230 includes a processor 260, a memory 262, an interface 264, a storage device 266, and a bus 268. The processor 260 performs the computation and control functions of the controller 230, and may comprise any type of processor or multiple processors, single integrated circuits such as a microprocessor, or any suitable number of integrated circuit devices and/or circuit boards working in cooperation to accomplish the functions of a processing unit. During operation, the processor 260 executes one or more programs 270 contained within the memory 262 and, as such, controls the general operation of the controller 230 and the computer system of the controller 230, preferably in executing the steps of the processes described herein, such as the steps of the process 300 (and any sub-processes thereof) in connection with FIG. 3.

The memory 262 can be any type of suitable memory. This would include the various types of dynamic random access memory (DRAM) such as SDRAM, the various types of static RAM (SRAM), and the various types of non-volatile memory (PROM, EPROM, and flash). In certain examples, the memory 262 is located on and/or co-located on the same computer chip as the processor 260. In the depicted embodiment, the memory 262 stores the above-referenced program 270 along with one or more stored values 272 for use in making the lane determinations. In one such embodiment, the stored values 272 comprise threshold values for implementing an active lane control feature for the vehicle, such as an LKA or LCA feature (such as predetermined threshold distances from the vehicle to a lane marker that would trigger LKA and/or LCA activation).

The bus 268 serves to transmit programs, data, status and other information or signals between the various components of the computer system of the controller 230. The interface 264 allows communication to the computer system of the controller 230, for example from a system driver and/or another computer system, and can be implemented using any suitable method and apparatus. It can include one or more network interfaces to communicate with other systems or components. The interface 264 may also include one or more network interfaces to communicate with technicians, and/or one or more storage interfaces to connect to storage apparatuses, such as the storage device 266.

The storage device 266 can be any suitable type of storage apparatus, including direct access storage devices such as hard disk drives, flash systems, floppy disk drives and optical disk drives. In one exemplary embodiment, the storage device 266 comprises a program product from which memory 262 can receive a program 270 that executes one or more embodiments of one or more processes of the present disclosure, such as the steps of the process 300 (and any sub-processes thereof) of FIG. 3, described further below. In another exemplary embodiment, the program product may be directly stored in and/or otherwise accessed by the memory 262 and/or a disk (e.g., disk 274), such as that referenced below.

The bus 268 can be any suitable physical or logical means of connecting computer systems and components. This includes, but is not limited to, direct hard-wired connections, fiber optics, infrared and wireless bus technologies. During operation, the program 270 is stored in the memory 262 and executed by the processor 260.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 260) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system of the controller 230 may also otherwise differ from the embodiment depicted in FIG. 2, for example in that the computer system of the controller 230 may be coupled to or may otherwise utilize one or more remote computer systems and/or other control systems.

Figure 3:
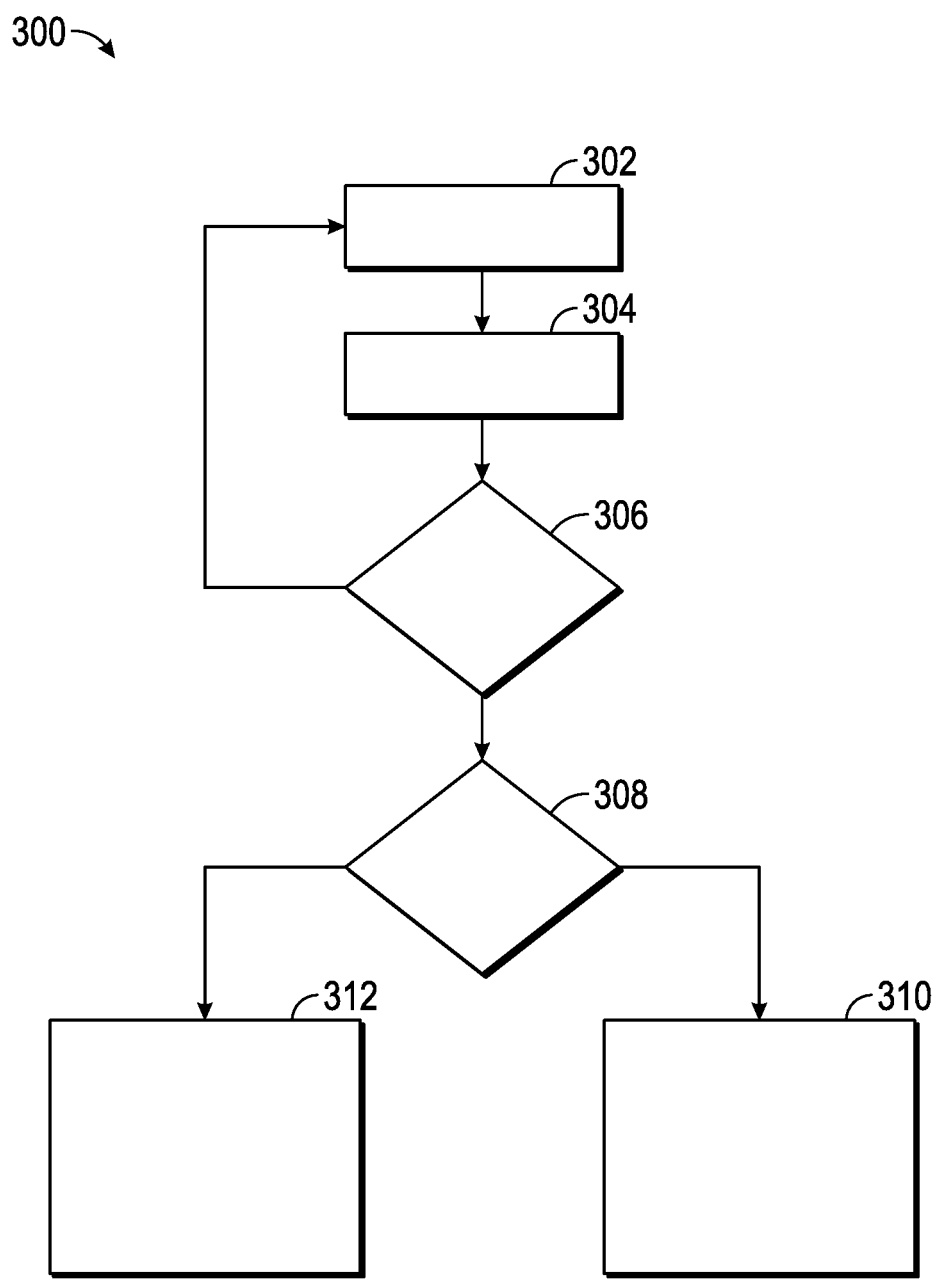
FIG. 3 is a flowchart of a process for implementing vehicle lane control, and that can be used in connection with the vehicle of FIG. 1 and the system of FIG. 2, in accordance with an exemplary embodiment.

FIG. 3 is a flowchart of a process 300 for making lane determinations for a vehicle travelling on a roadway, in accordance with an exemplary embodiment. The process can be implemented in connection with the vehicle 100 and the control system 170 of FIGS. 1-2, in accordance with an exemplary embodiment. The process 300 is preferably performed continuously during a current drive cycle (or ignition cycle) of the vehicle.

The process 300 includes the step of obtaining lane data (step 302). During step 302, information is preferably obtained about a lane in a roadway in which the vehicle is travelling. In one such embodiment, the data includes information as to a left lane marker and a right lane marker for the lane. In addition, in one such embodiment, the information of step 302 is obtained by one or more cameras of the sensors array 220 of FIG. 2. In other embodiments, the information of step 302 may be obtained via one or more other sensors of the sensor array 220, such as one or more other vision-based detection devices, radar devices (such as long and short range radar detection devices), and/or other target vehicle detection devices such as, by way of example, light detection and ranging (LIDAR) and/or vehicle-to-vehicle (V2V) communications, and/or from one or more other vehicle systems 221 of FIG. 2 (such as the electronic control system 118 of FIG. 1 and/or a global positioning system (GPS) device) that may provide information pertaining to the lane in which the vehicle is travelling.

Vehicle data is also obtained (step 304). During step 304, information is preferably obtained about a position and/or movement of the vehicle with respect to the lane in which the vehicle is travelling. In one such embodiment, the data includes information as to a distance between the vehicle and the left lane marker for the lane, as well as a distance between the right lane marker of the lane. In addition, in certain embodiments, the information of step 304 may also pertain to a direction and/or rate of movement of the vehicle toward the right or left lane marker. In one such embodiment, the information of step 304 is obtained by one or more cameras of the sensor array 220 of FIG. 2. In other embodiments, the information of step 304 may be obtained via one or more other sensors of the sensor array 220, such as one or more other vision-based detection devices, radar devices (such as long and short range radar detection devices), and/or other target vehicle detection devices such as, by way of example, light detection and ranging (LIDAR) and/or vehicle-to-vehicle (V2V) communications, and/or from one or more other vehicle systems 221 of FIG. 2 (such as the electronic control system 118 of FIG. 1 and/or a global positioning system (GPS) device) that may provide information pertaining to the vehicle.

A determination is made as to whether a lane control feature is activated (step 306). Preferably step 306 comprises a determination, based on the information from steps 302 and 304, as to whether an automatic lane control feature (such as an LKA or LCA feature) of the vehicle is activated. In certain embodiments, the determination of step 306 is based on a distance between the vehicle and the right lane marker and/or a distance between the vehicle and the left lane marker of the lane in which the vehicle is travelling.

In one such embodiment involving LKA functionality, the determination of step 306 comprises a determination as to whether the vehicle should be guided back into its lane, based on the distance(s) between the vehicle and the left and/or right lane marker(s). For example, in one implementation of the process 300 with an LKA feature, the determination of step 306 is "yes" if the vehicle has breached one of the lane markers (i.e., if the distance from the vehicle to the lane maker is zero).

In another embodiment involving LCA functionality, the determination of step 306 comprises a determination as to whether the vehicle should be guided back toward the center of its lane, based on the distance(s) between the vehicle and the left and/or right lane marker(s). For example, in one implementation of the process 300 with an LCA feature, the determination of step 306 is "yes" if the distance between the vehicle and one of the lane markers has decreased below a predetermined threshold that would indicate that the vehicle is no longer sufficiently located "on-center" within the lane. The LCA functionality, may be used, for example, if the driver's hands are off of the steering wheel.

In certain embodiments, a change in distance between the vehicle and the lane marker and/or the rate of change thereof may also be used in the determination of step 306. The determination of step 306 is preferably made by the controller 230 of FIG. 2 (preferably by the processor 260 thereof) using the information from steps 302 and 304.

If the determination of step 306 is "no" (i.e., that the lane control feature need not be activated, or in other words, in the embodiments discussed above, that the vehicle does not need to be automatically guided back into the lane or toward the center of the lane), then the process returns to step 302. Steps 302-306 thereafter repeat, preferably continuously, until a determination is made in a subsequent iteration of step 306 that a lane control feature is activated.

If the determination of step 306 is "yes" (i.e., that the lane control feature is activated, or in other words, in the embodiments discussed above, that the vehicle needs to be automatically guided back into the lane or toward the center of the lane), then a determination is made as to the direction from which the lane control is desired (step 308). Preferably step 308 comprises a determination made by the controller 230 of FIG. 2 (most preferably by the processor 260 thereof), based on the information from steps 302 and 304, as to which direction the vehicle has strayed. In certain embodiments, the determination of step 308 is based on a distance between the vehicle and the right lane marker and/or a distance between the vehicle and the left lane marker of the lane in which the vehicle is travelling.

In one such embodiment, the determination of step 308 comprises a determination as to which lane marker the vehicle has crossed or is approaching (i.e., the right lane marker or the left lane marker of the lane in which the vehicle is travelling). For example, if the vehicle has crossed the right lane marker, or the distance between the vehicle and the right lane marker has decreased below a certain predetermined threshold (and/or has decreased in an amount that exceeds a predetermined threshold, and/or has decreased at a rate that exceeds a predetermined threshold), then lane control assistance is required from the right side (i.e., the passenger side, for vehicles in the United States), as the vehicle has been straying to the right. Conversely, if the vehicle has crossed the left lane marker, or the distance between the vehicle and the left lane marker has decreased below a certain predetermined threshold (and/or has decreased in an amount that exceeds a predetermined threshold, and/or has decreased at a rate that exceeds a predetermined threshold), then lane control assistance is required from the left side (i.e., the driver side, for vehicles in the United States), as the vehicle has been straying to the left.

If the determination of step 308 is that lane correction is required from the right (i.e. that the vehicle is straying to the right), then differential torque is applied with relatively greater torque to the right side of the vehicle (i.e., the passenger side, in United States vehicles) (step 310). During step 310, differential torque is applied to the wheels of the vehicle such that the passenger side wheels receive relatively greater torque as compared with the driver side wheels. Specifically, at least one of the passenger side wheels receives relatively greater torque than a respective one of the driver side wheels. In certain embodiments, each of the passenger side wheels receives relatively greater torque than a respective one of the driver side wheels. The differential torque is preferably provided via instructions provided by the controller 230 of FIG. 2 (most preferably by the processor 260 thereof).

In one embodiment of step 310, the differential torque is provided via instructions provided by the processor 260 to the motors 240 of FIG. 2 to provide relatively greater torque to the passenger side wheels than to the driver side wheels (for example, the motors 240 coupled to the passenger side wheels may be turned on while the motors 240 coupled to the driver side wheels are turned off, or the motors 240 coupled to the passenger side wheels may operate at a faster rate than the motors 240 coupled to the driver side wheels, or the like). In another embodiment of step 310, the differential torque is provided via a torque vectoring differential between the one or more driver side wheels and the one or more passenger side wheels that results from instructions provided by the processor 260 to the actuators 250 of FIG. 2 to provide relatively greater torque to the passenger side wheels than to the driver side wheels (for example, actuators 250 coupled to the passenger side wheels may be turned on while actuators 250 coupled to the driver side wheels are turned off, or actuators 250 coupled to the passenger side wheels may operate at a faster rate than actuators 250 coupled to the driver side wheels, or the like). In one such example, the actuation is accomplished by speeding up the wheel(s) that are proximate to and/or approaching the lane line. In another such example, the actuation is accomplished by slowing down the wheel(s) that are on the other side of the vehicle (i.e. opposite the lane line). As a result, in any of these examples the vehicle is automatically guided to the left so that the vehicle remains within its lane and/or near the center of its lane.

If the determination of step 308 is that lane correction is required from the left (i.e. that the vehicle is straying to the left), then differential torque is applied with relatively greater torque to the left side of the vehicle (i.e., the driver side, in United States vehicles) (step 312). During step 312, differential torque is applied to the wheels of the vehicle such that the driver side wheels receive relatively greater torque as compared with the passenger side wheels. Specifically, at least one of the driver side wheels receives relatively greater torque than a respective one of the passenger side wheels. In certain embodiments, each of the driver side wheels receives relatively greater torque than a respective one of the passenger side wheels. The differential torque is preferably provided via instructions provided by the controller 230 of FIG. 2 (most preferably by the processor 260 thereof).

In one embodiment, the differential torque is provided via instructions provided by the processor 260 to the motors 240 of FIG. 2 to provide relatively greater torque to the driver side wheels than to the passenger side wheels (for example, the motors 240 coupled to the driver side wheels may be turned on while the motors 240 coupled to the passenger side wheels are turned off, or the motors 240 coupled to the driver side wheels may operate at a faster rate than the motors 240 coupled to the passenger side wheels, or the like). In another embodiment, the differential torque is provided via a torque vectoring differential between the one or more driver side wheels and the one or more passenger side wheels that results from instructions provided by the processor 260 to the actuators 250 of FIG. 2 to provide relatively greater torque to the driver side wheels than to the passenger side wheels (for example actuators 250 coupled to the driver side wheels may be turned on while actuators 250 coupled to the passenger side wheels are turned off, or actuators 250 coupled to the driver side wheels may operate at a faster rate than actuators 250 coupled to the passenger side wheels, or the like). In one such example, the actuation is accomplished by speeding up the wheel(s) that are proximate to and/or approaching the lane line. In another such example, the actuation is accomplished by slowing down the wheel(s) that are on the other side of the vehicle (i.e. opposite the lane line). As a result, in either example, the vehicle is automatically guided to the right so that the vehicle remains within its lane and/or near the center of its lane.

Accordingly, methods and systems are provided for lane control of vehicles. Specifically, in various embodiments, automatic lane control features, such as LKA and/or LCA features, are implemented using differential torque application between passenger side wheels and driver side wheels. This allows for implementation of the automatic lane control features that may feel more pleasing and/or natural to the driver, as compared with existing techniques. As a result, the disclosed methods and techniques may also lead to more correct and/or optimal usage of such automatic lane control features (for example, because drivers may be more likely to refrain from disabling such features if they feel more pleasing and/or natural to the driver).

It will be appreciated that the disclosed methods, systems, and vehicles may vary from those depicted in the Figures and described herein. For example, the vehicle 100, control system 170, and/or various components thereof may vary from that depicted in FIGS. 1 and 2 and described in connection therewith. In addition, it will be appreciated that certain steps of the process 300 may vary from those depicted in FIG. 3 and/or described above in connection therewith. It will similarly be appreciated that certain steps of the process described above may occur simultaneously or in a different order than that depicted in FIG. 3 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

We claim:

1. A method for implementing a lane control feature for a vehicle having a passenger side, a driver side, one or more passenger side wheels on the passenger side of the vehicle, and one or more driver side wheels on the driver side of the vehicle, the method comprising:
   determining whether the lane control feature is activated; and
   providing differential torque between one or more driver side wheels and one or more passenger side wheels when the lane control feature is activated, wherein the step of providing the differential torque comprises providing the differential torque via one or more motors coupled to the wheels.

2. The method of claim 1, wherein each of the one or more motors comprises a wheel hub motor disposed within a wheel hub of one of the wheels.

3. The method of claim 1, wherein the step of providing the differential torque further comprises providing a torque vectoring differential between the one or more driver side wheels and the one or more passenger side wheels via a steering system of the vehicle.

4. The method of claim 3, wherein the steering system comprises a steering rack and a differential having one or more actuators, and the step of providing the torque vectoring differential comprises providing the torque vectoring differential via the one or more actuators.

5. The method of claim 1, wherein:
   the step of determining whether the lane control feature is activated comprises determining whether a lane keeping assist feature is activated; and
   the step of providing the differential torque comprises providing the differential torque when the lane keeping assist feature is activated.

6. The method of claim 1, wherein:
   the step of determining whether the lane control feature is activated comprises determining whether a lane centering assist feature is activated; and the step of providing the differential torque comprises providing the differential torque when the lane centering assist feature is activated.

7. A system for implementing a lane control feature for a vehicle having a passenger side, a driver side, one or more passenger wheels on the passenger side, one or more driver side wheels on the driver side, and a steering system, the system comprising:
- a sensor configured to obtain information pertaining to operation of the vehicle with respect to a lane of a roadway; and
- a processor coupled to the sensor and configured to at least facilitate:
  - determining, using the information, whether the lane control feature is activated; and
  - providing differential torque between one or more driver side wheels and one or more passenger side wheels, by providing a torque vectoring differential between the one or more driver side wheels and the one or more passenger side wheels via the steering system, when the lane control feature is activated.

8. The system of claim 7, further comprising:
one or more motors coupled to the wheels;
wherein the processor is further configured to at least facilitate providing the differential torque via the one or more motors.

9. The system of claim 8, wherein each wheel has a wheel hub, and each of the one or more motors comprises a wheel hub motor disposed within the wheel hub of one of the wheels.

10. The system of claim 7, wherein:
the steering system comprises a steering rack and a differential having one or more actuators; and
the processor is configured to provide the torque vectoring differential via the one or more actuators.

11. The system of claim 7, wherein the processor is configured to at least facilitate:
determining whether a lane keeping assist feature is activated; and
providing the differential torque when the lane keeping assist feature is activated.

12. The system of claim 7, wherein the processor is configured to at least facilitate:
determining whether a lane centering assist feature is activated; and
providing the differential torque when the lane centering assist feature is activated.

13. A vehicle comprising:
- a body having a passenger side and a driver side;
- one or more passenger side wheels on the passenger side;
- one or more driver side wheels on the driver side;
- a sensor configured to obtain information pertaining to operation of the vehicle with respect to a lane of a roadway; and
- a processor coupled to the sensor and configured to at least facilitate:
  - determining, using the information, whether a lane control feature is activated, wherein the lane control feature comprises a lane keeping assist feature; and
  - providing differential torque between one or more driver side wheels and one or more passenger side wheels when the lane control feature is activated.

14. The vehicle of claim 13, wherein:
each wheel has a wheel hub
the vehicle further comprises one or more motors each disposed within the wheel hub of one of the wheels; and
the processor is configured to at least facilitate providing the differential torque via the one or more motors.

15. The vehicle of claim 13, wherein the vehicle has a steering system, and the processor is configured to at least facilitate providing a torque vectoring differential between the one or more driver side wheels and the one or more passenger side wheels via the steering system.

16. The vehicle of claim 15, further comprising:
a steering rack; and
a differential having one or more actuators;
wherein the processor is configured to provide the torque vectoring differential via the one or more actuators.

* * * * *